United States Patent
Schultz et al.

(10) Patent No.: US 10,421,262 B2
(45) Date of Patent: Sep. 24, 2019

(54) METHOD OF ASSEMBLING A SMC VEHICLE ROOF ASSEMBLY

(71) Applicants: Jason E Schultz, Clarkston, MI (US); Zachariah Smith, Madison Heights, MI (US); Mikil Sockow, Troy, MI (US)

(72) Inventors: Jason E Schultz, Clarkston, MI (US); Zachariah Smith, Madison Heights, MI (US); Mikil Sockow, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 204 days.

(21) Appl. No.: 15/358,964

(22) Filed: Nov. 22, 2016

(65) Prior Publication Data
US 2018/0141322 A1    May 24, 2018

(51) Int. Cl.
| | |
|---|---|
| *B62D 25/06* | (2006.01) |
| *B32B 37/18* | (2006.01) |
| *B60J 7/10* | (2006.01) |
| *B32B 37/06* | (2006.01) |
| *B32B 38/00* | (2006.01) |
| *B32B 37/02* | (2006.01) |
| *B62D 27/02* | (2006.01) |
| *C09J 5/06* | (2006.01) |

(52) U.S. Cl.
CPC ............ *B32B 37/182* (2013.01); *B32B 37/02* (2013.01); *B32B 37/06* (2013.01); *B32B 38/0036* (2013.01); *B60J 7/106* (2013.01); *B62D 27/026* (2013.01); *C09J 5/06* (2013.01); *B32B 2038/0076* (2013.01); *B32B 2255/00* (2013.01); *B32B 2307/102* (2013.01); *B32B 2398/00* (2013.01); *B32B 2605/00* (2013.01)

(58) Field of Classification Search
CPC ........... B62D 27/026; B62D 25/06; C09J 5/06
USPC ......................................................... 296/210
See application file for complete search history.

(56) References Cited

U.S. PATENT DOCUMENTS

| | | | | |
|---|---|---|---|---|
| 4,195,215 | A * | 3/1980 | Clarke ................ | B23K 11/163 219/91.21 |
| 5,968,298 | A * | 10/1999 | Staquet .................. | B29C 73/04 156/256 |
| 6,135,535 | A * | 10/2000 | Tarahomi ................ | B60J 7/106 296/102 |
| 6,475,937 | B1 * | 11/2002 | Preisler ............... | B60R 13/0225 280/751 |
| 7,377,581 | B2 * | 5/2008 | Barutzky ............... | B62D 25/06 296/203.03 |
| 8,636,197 | B1 | 1/2014 | Hill et al. | |

(Continued)

*Primary Examiner* — Scott W Dodds
(74) *Attorney, Agent, or Firm* — Ralph E Smith

(57) ABSTRACT

A rear SMC component is adhesively bonded to a central SMC component to form a cavity adjacent the rear wall that encloses a tapping plate. A reinforcing SMC component is adhesively bonded to the central SMC component with a rail portion against the top wall and a rear gusset portion against the rear wall. Conductive heaters are positioned directly against the surfaces on both sides of the adhesive for the rail portion but only on the interior side of the adhesive for the gusset portion, because the rear component blocks access thereto. As a result, the adhesive for the gusset portion is only partially cured by the heater. A gusset fastener is installed through the rear gusset portion and the rear wall and into the tapping plate to fixedly retain the rear gusset portion against the rear wall while this partially cured adhesive subsequently cures.

11 Claims, 6 Drawing Sheets

(56) References Cited

U.S. PATENT DOCUMENTS

| | | | |
|---|---|---|---|
| 9,033,401 B1 * | 5/2015 | Donabedian | B62D 27/026 296/187.02 |
| 2003/0098595 A1 * | 5/2003 | Carter | B32B 17/10036 296/146.15 |
| 2014/0028057 A1 * | 1/2014 | Nishimura | B62D 25/04 296/193.06 |
| 2014/0368001 A1 * | 12/2014 | Jeakle | B60J 7/11 296/218 |

* cited by examiner

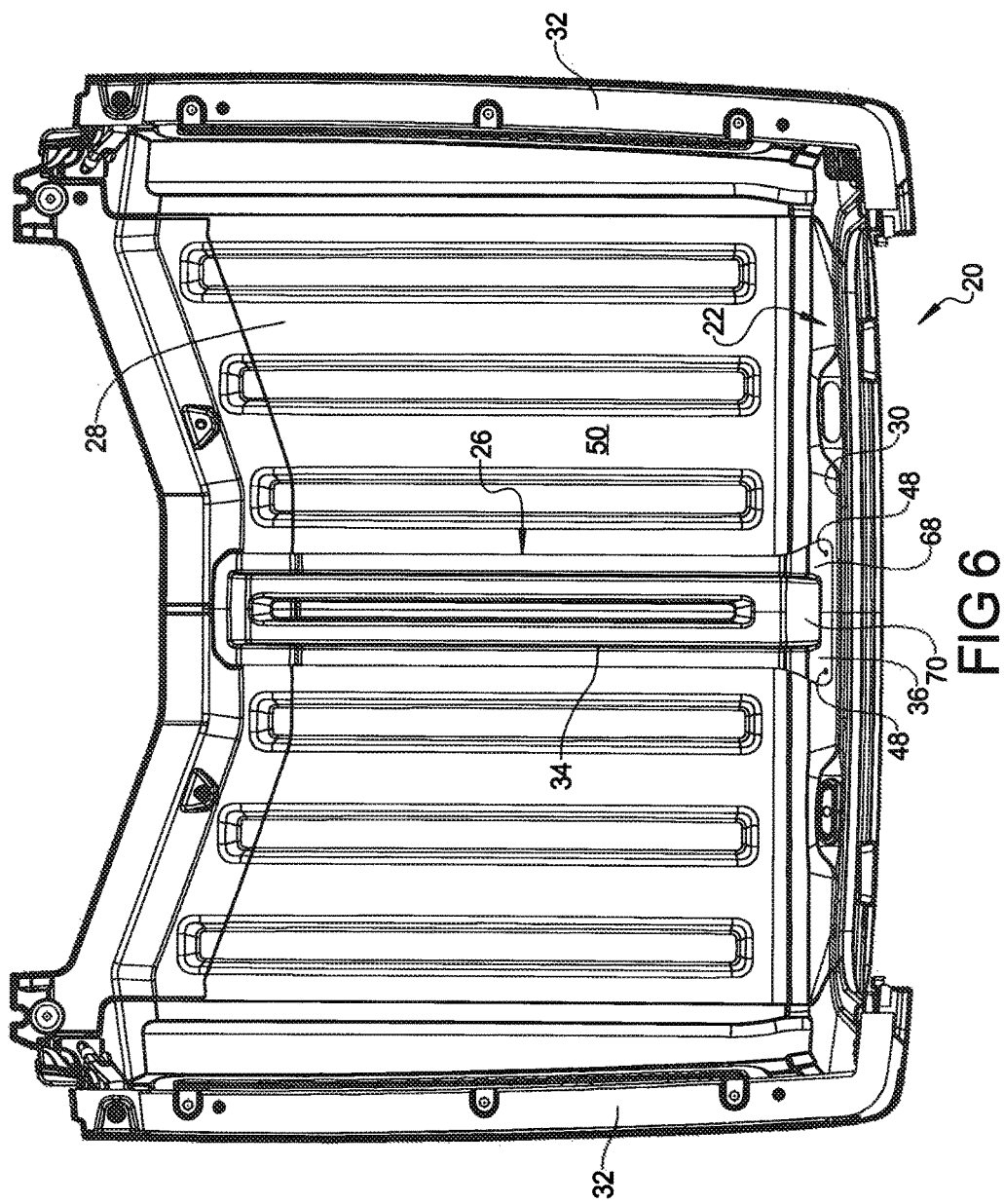

METHOD OF ASSEMBLING A SMC VEHICLE ROOF ASSEMBLY

FIELD

The present disclosure relates to methods of assembling an automotive roof from sheet molding compound or sheet molding composite (SMC) components including reinforcing members.

BACKGROUND

The automotive industry has been turning to lighter weight, high strength materials. Body panels or components made of such materials tend to be thinner than those they are replacing. As a result, it is sometimes necessary to include a reinforcing rail to such components to enable appropriate management of noise, vibration and harshness (NVH).

SMC is one class of lightweight materials that has been used in the automotive industry. For example, removable hard top roofs have been assembled from SMC components adhesively bonded together. Adhesive bonding is used because SMC is not suitable for other similar joining operations, such as welding. Although convectively heating the components, such as occurs during baking of an e-coat, could provide some curing of the adhesive bond, this heating does not occur at an appropriate point in the manufacturing process, and would almost certainly require additional bake time to insure the necessary curing of the adhesive bond. Thus, it is generally acknowledged that heat must be conductively applied directly to both sides of the panels being joined at the adhesive bond in order to cure the adhesive sufficiently and quickly enough for the automotive manufacturing industry.

As a result, SMC is considered unsuitable in the automotive industry in situations where conduction heater access to either side of the panels being joined at the adhesive bond is prevented. Thus, skilled artisans in the automotive industry would either use a different material in an assembly, or avoid configurations requiring bonding of two components where such two sided heater access is prevented. For example, reinforcing members of prior removable automotive SMC hard top roofs are designed to accomplish their purposes, including appropriately managing component NVH, without being additionally bonded to adjacent side or rear walls of the hardtop.

SUMMARY

In accordance with on aspect of the present disclosure, a method of assembling a SMC vehicle roof assembly includes forming a central SMC component having an interior surface and an exterior surface to include a top wall with a rear wall extending from the top wall. An outer rear SMC component is formed with an interior surface and an exterior surface. A reinforcing SMC component is formed with a longitudinal rail portion and a rear gusset portion. A tapping plate is coupled against the exterior surface of the rear wall of the central SMC component. The rear SMC component is positioned against the exterior surface of the central SMC component to form a cavity adjacent the rear wall and enclosing the coupled tapping plate between the central and rear SMC components and with an exterior adhesive for forming an exterior adhesive bond therebetween. A heater is positioned against each of the interior surface of the central SMC component and the exterior surface of the rear SMC component on opposite sides of the exterior adhesive to heat and cure the exterior adhesive and to form the exterior adhesive bond therebetween. The reinforcing SMC component is positioned with the longitudinal rail portion against the interior surface of the top wall of the central SMC component and with the rear gusset portion against the interior surface of the rear wall opposite the cavity, and with an interior adhesive for forming an interior adhesive bond therebetween. A rail heater is positioned against each of (1) the interior surface of the longitudinal rail portion of the reinforcing SMC component and (2) the exterior surface of the top wall of the central SMC component on opposite sides of the interior adhesive to heat and cure a longitudinal rail portion of the interior adhesive and form the interior adhesive bond between the top wall of the central SMC component and the longitudinal rail portion of the reinforcing SMC component. An interior gusset heater is positioned against the interior surface of the rear gusset portion of the reinforcing SMC component interiorly of the interior adhesive to heat and partially cure a rear gusset portion of the interior adhesive and form the interior adhesive bond between the rear wall of the central SMC component and the rear gusset portion of the reinforcing SMC component. A gusset fastener is installed through the rear gusset portion and the rear wall and into the tapping plate to fixedly retain the rear gusset portion against the rear wall while the partially formed interior adhesive bond subsequently cures. The exterior adhesive bond is formed prior to forming the interior adhesive bond.

In another aspect of the present disclosure, the gusset fastener is installed after the partially curing the rear gusset portion of the interior adhesive.

In another aspect of the present disclosure, the gusset fastener includes a plurality of threaded gusset fasteners and installing the threaded gusset fasteners includes threading the threaded gusset fasteners into respective cooperating threaded openings of the tapping plate after the partially curing the rear gusset portion of the interior adhesive.

In another aspect of the present disclosure, forming the reinforcing SMC component further includes forming a gusset fastener aperture in a rear wall contacting portion of the rear gusset portion; and further includes providing a space between the gusset fastener aperture and the rear gusset portion of the interior adhesive in which the interior adhesive is absent.

In another aspect of the present disclosure, coupling the tapping plate includes riveting the tapping plate to the exterior surface of the rear wall of the central SMC component.

In another aspect of the present disclosure, forming the reinforcing SMC component includes forming the rear gusset portion with both rear wall contacting and non-contacting portions, and positioning the rivets within the rear wall non-contacting portion of the rear gusset.

In other aspects of the present disclosure, forming the central SMC component, the outer rear SMC component, and the reinforcing SMC component, includes forming components of a two-door vehicle removable hard top. Alternatively or additionally, positioning the reinforcing SMC component includes positioning the reinforcing SMC component in a middle of, and with the longitudinal rail portion aligned with, a fore/aft direction of the SMC vehicle roof assembly. As a further alternative or additional aspect, the SMC vehicle roof assembly is subsequently painted and then baked in an e-coating oven to cure the paint, wherein the baking to cure the paint further cures the partially cured rear gusset portion of the interior adhesive.

In another aspect of the present disclosure, the reinforcing SMC component including the rear gusset portion is designed to enhance the NVH properties of the SMC vehicle roof assembly related to movement of the rear wall of the central SMC component.

DRAWINGS

The present invention will become more fully understood from the detailed description and the accompanying drawings.

FIG. 6 is a plan view illustrating the reinforcing SMC component with the rail portion adhesively bonded and with the gusset portion at least partially adhesively bonded and mechanically fastened to the central SMC component.

DETAILED DESCRIPTION

Figure 1:
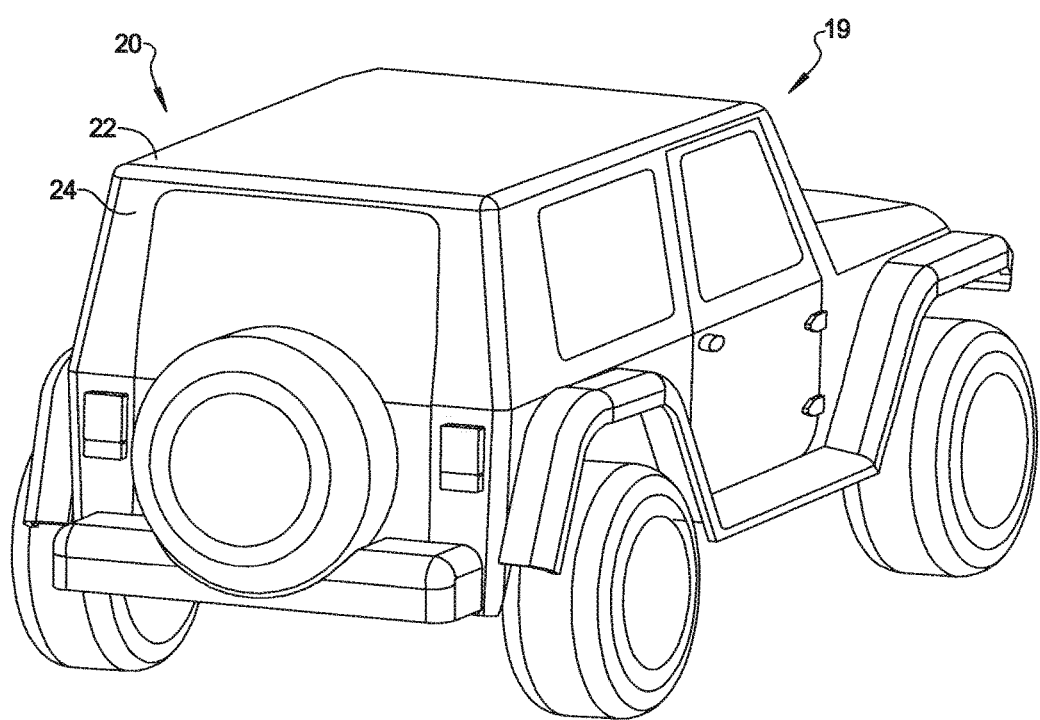
FIG. 1 is a perspective view of one example SMC vehicle roof assembly resulting from the assembly method, which is a removable hard top of a two-door automobile.

Further areas of applicability will become apparent from the description, claims and drawings, wherein like reference numerals refer to like features throughout the several views of the drawings. It should be understood that the detailed description, including disclosed embodiments and drawings referenced therein, are merely exemplary in nature, intended for purposes of illustration only, and are not intended to limit the scope of the present disclosure.

Figure 2:
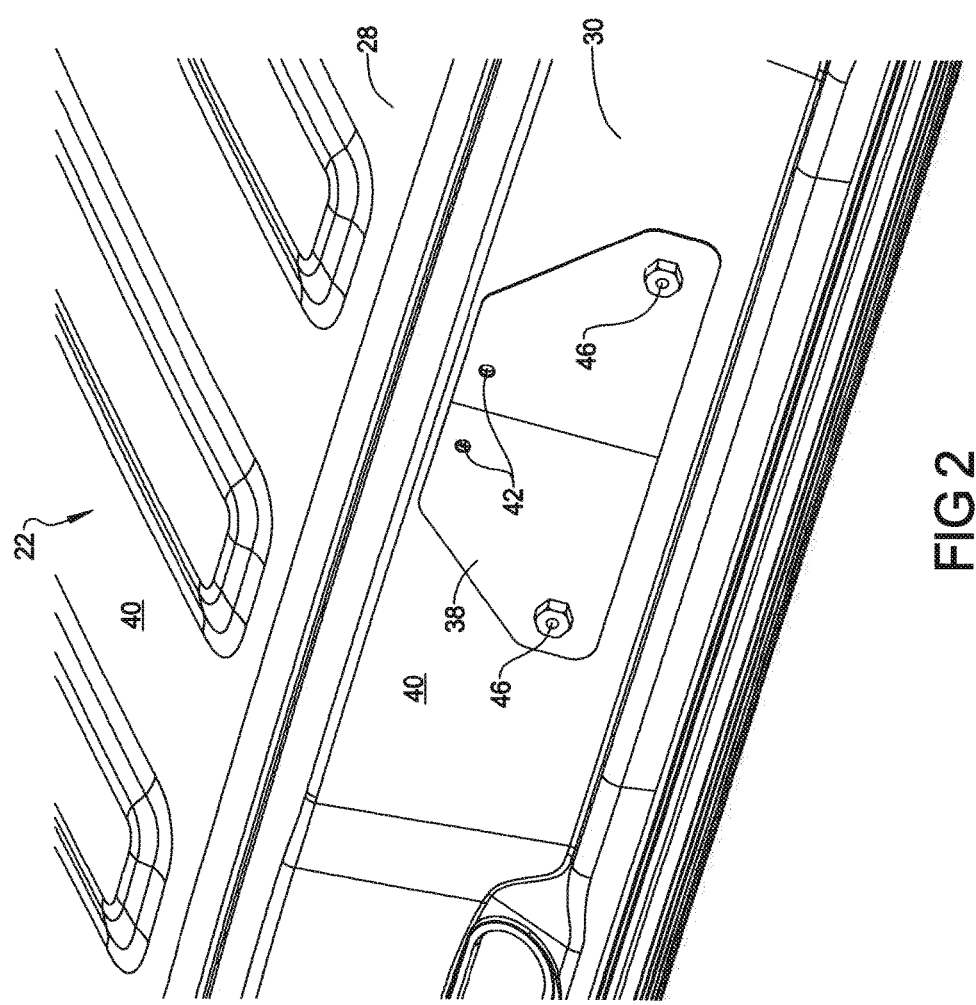
FIG. 2 is a perspective view of the central panel with the tapping plate coupled to the rear wall thereof.
Figure 3:
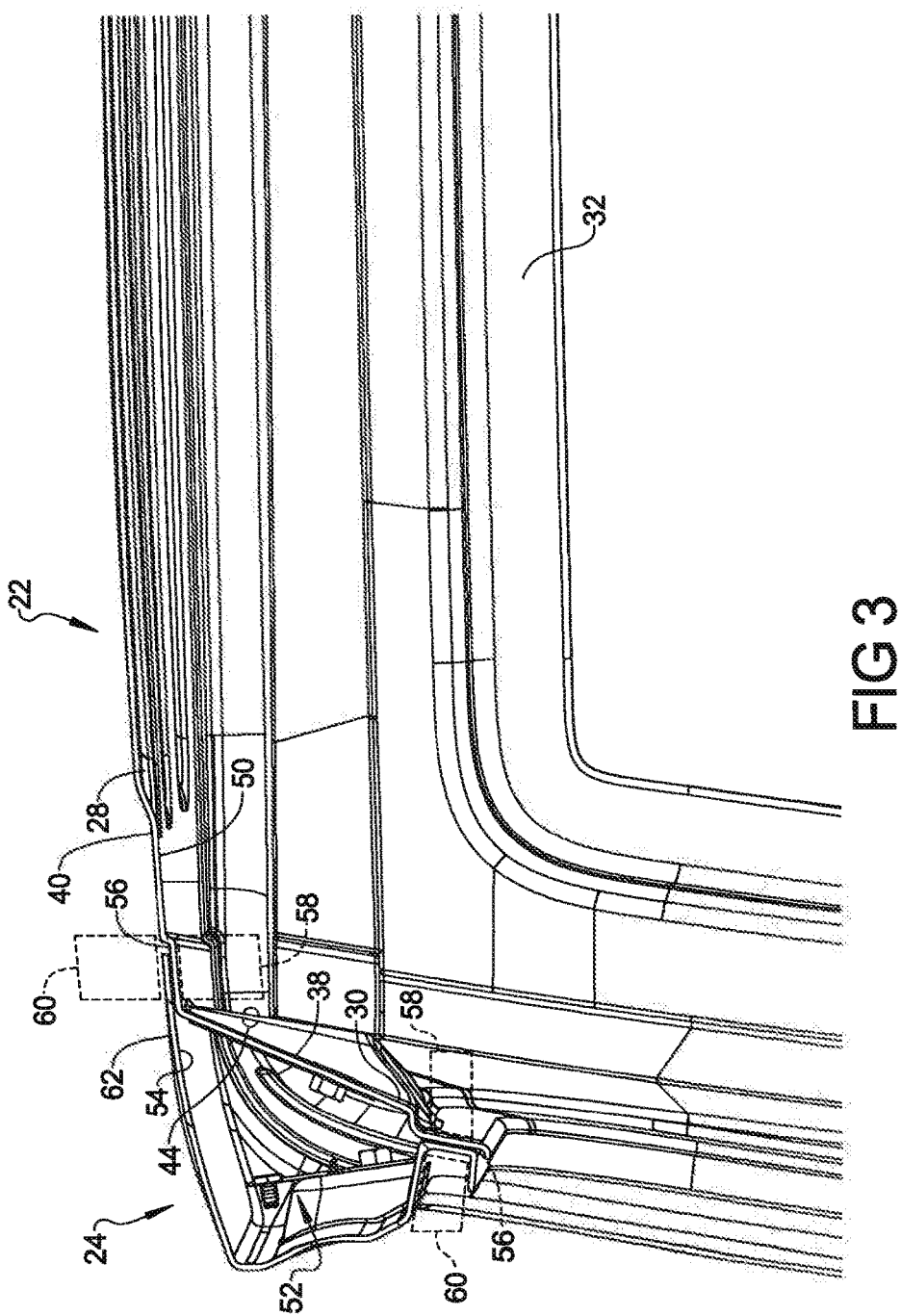
FIG. 3 is a cross-section view illustrating conductive heating of exterior adhesive joining the rear SMC component to the central SMC component.
Figure 4:
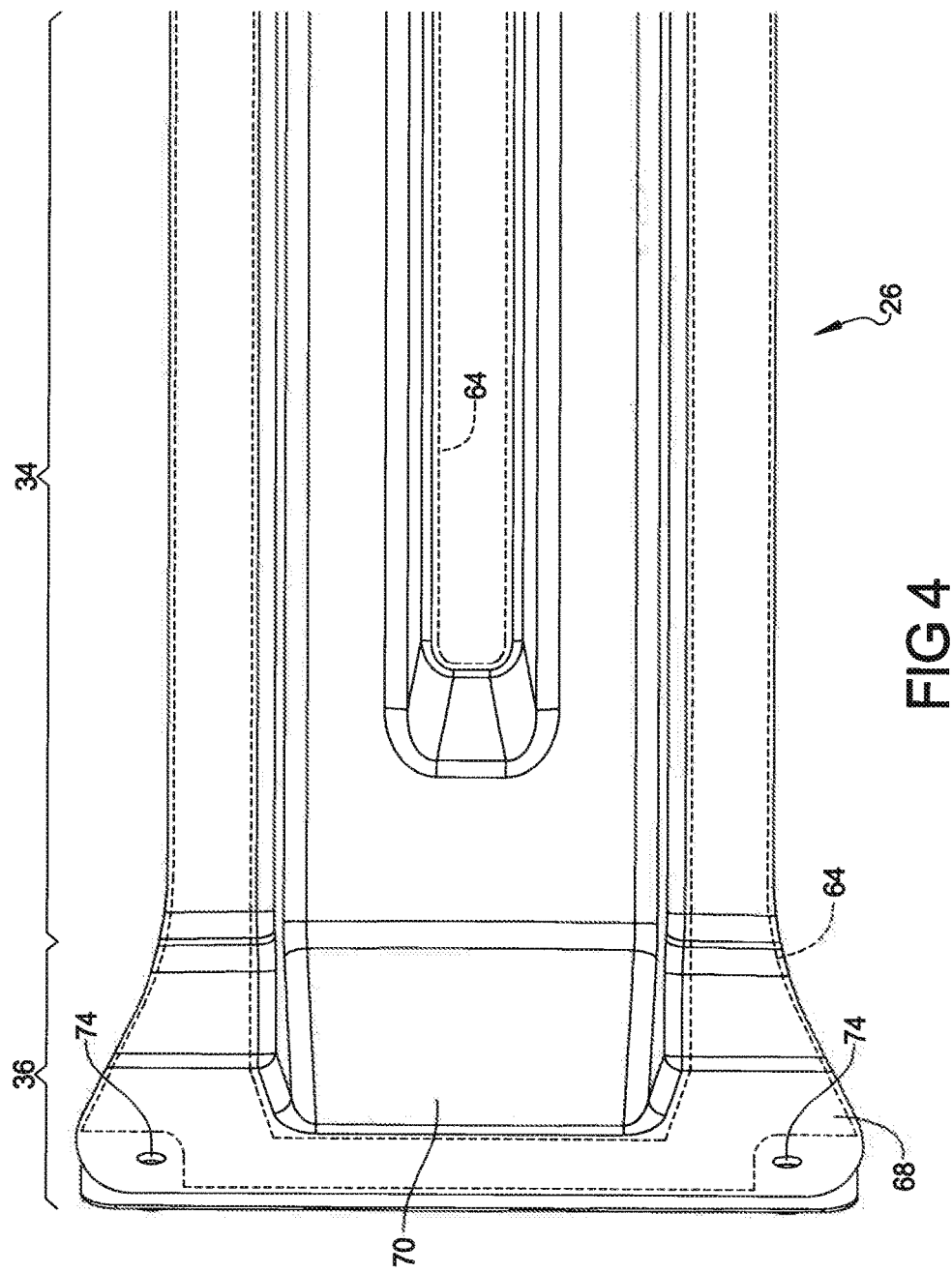
FIG. 4 is a cross-section view showing conductive heating of exterior adhesive joining the rear SMC component to the central SMC component.
Figure 5:
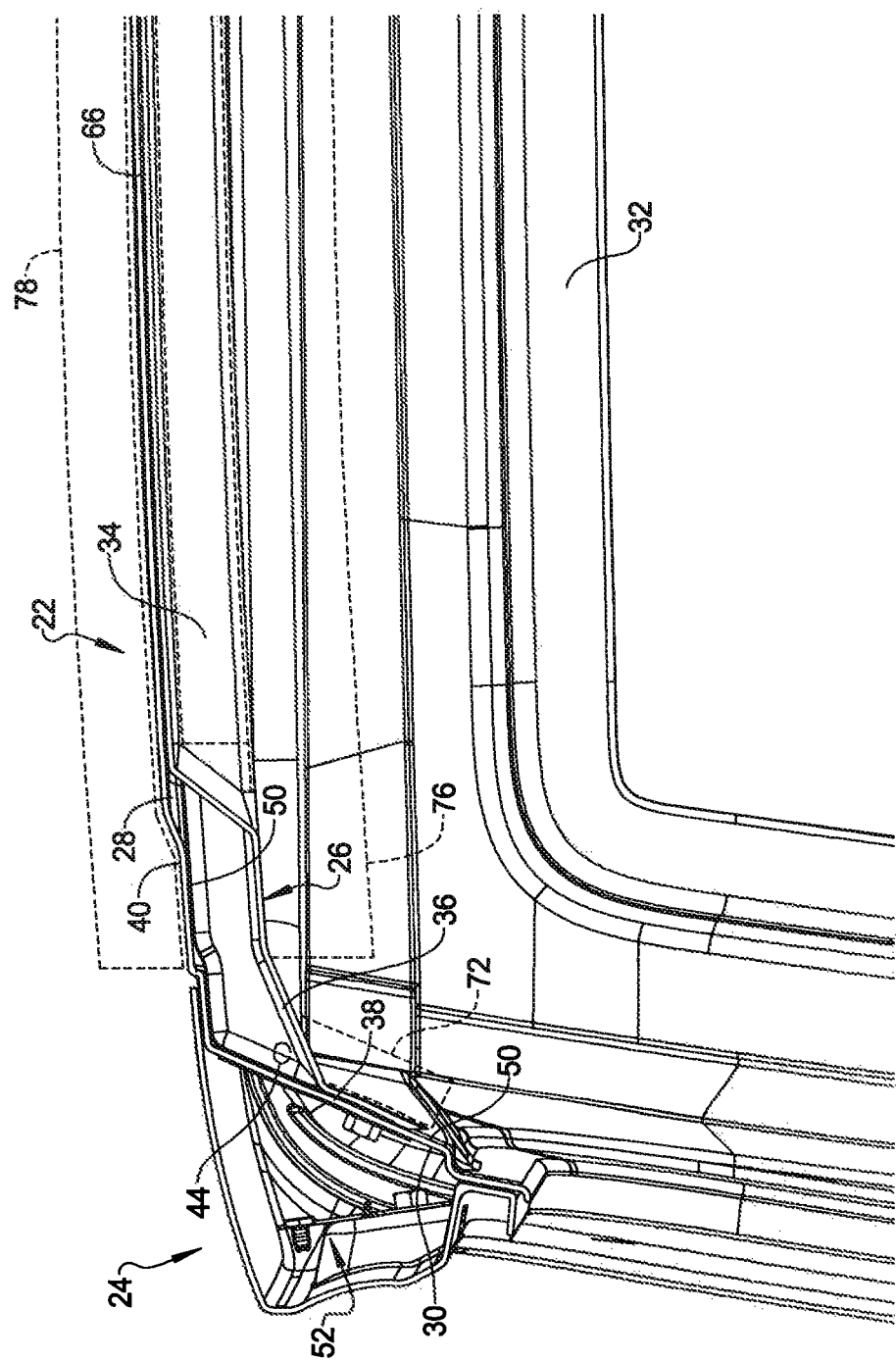
FIG. 5 is a cross-section view illustrating conductive heating of interior adhesive joining the reinforcing SMC component to the central SMC component.

Referring to FIGS. 1-6, one example of a method of assembling a SMC vehicle roof assembly 20 in accordance with the present disclosure is exemplified with reference to a removable hard top for a two-door automobile 19. In other words, the SMC vehicle roof assembly 20 resulting from the example method is a removable hard top 20 for a two-door automobile 19. The structural and NVH performance requirements and design criteria of a reinforcing component for a removable vehicle hard top 20 are different from those of non-removable vehicle roofs. Similarly, the structural and NVH performance requirements and design criteria of a reinforcing component for a two-door vehicle hard top 20 are different than those for a four-door vehicle hard top. Likewise, the structural and NVH performance requirements and design criteria of an SMC reinforcing component for a SMC roof assembly 20 are different from those of metal roofs.

The example method includes forming a central SMC component 22, an outer rear SMC component 24, and a reinforcing SMC component 26. The illustrated central SMC component 22 includes a top wall 28 integrally formed with a rear wall 30 extending from the top wall 28. Side walls 32 are adhesively bonded along longitudinally extending sides of the central SMC component 22. Alternatively the side walls 32 are integrally formed with the central SMC component 22. The illustrated outer rear SMC component 24 has a generally inverted U-shaped configuration. The reinforcing SMC component 26 has a longitudinal rail portion 34 and a rear gusset portion 36.

A tapping plate 38 is coupled to the exterior surface 40 of the rear wall 30 of the central SMC component 22. Specifically, the illustrated tapping plate 38 is a metal plate that has two apertures 42 through which respective rivets 44 extend to rivet the tapping plate 38 against the exterior surface 40 of the rear wall 30. The tapping plate 38 also includes two threaded apertures 46 for receiving respective threaded fasteners 48 as described hereinafter.

After the tapping plate 38 is coupled against the rear wall 30, the rear SMC component 24 is positioned against the exterior surface 40 of the central SMC component 22 to form a cavity 52 adjacent the rear wall 30 and enclosing the tapping plate 38 between the rear wall 30 portion of the exterior surface 40 of the central SMC component 22 and the interior surface 54 of the rear SMC component 24. An exterior adhesive 56 is provided between the interior, or interiorly-facing, surface 54 of the rear SMC component 24 and the exterior surface 40 of the central SMC component 22 on both sides of the cavity 52. The exterior adhesive 56 is positioned to form an exterior bond between the surfaces, 40 and 54.

An interior rear component heater 58 is positioned against the interior surface 50 of the central SMC component 22. An exterior rear component heater 60 is positioned against the exterior surface 62 of the rear SMC component 24 so that the interior and exterior rear component heaters 58 and 60, respectively, are positioned to provide heat to opposite sides of the exterior adhesive 56 to quickly and fully cure the exterior adhesive 56 to provide the exterior bond between the surfaces, 40 and 54. This is an exterior bond because it is positioned to the exterior of the SMC vehicle roof assembly 20, which means if this adhesive bond fails, then dirt and water from outside the vehicle can infiltrate between the components and into the assembly 20. Thus, such exterior adhesive bonds should take priority over interior adhesive bonds in order to avoid potential bonding failures.

After forming the exterior adhesive bonds, the interior adhesive bonds are formed. The reinforcing SMC component 26 is positioned with the longitudinal rail portion 34 against the interior surface 50 of the top wall 28 of the central SMC component 22. The reinforcing SMC component 26 is additionally positioned with the gusset portion 36 against the interior surface 50 of the rear wall 30 opposite the cavity 52. An interior adhesive 64 is provided between the exterior, or exteriorly-facing, surface 66 of the reinforcing SMC component 26 and the interior surface 50 of the central SMC component 22. The interior adhesive 64 is positioned to form an interior bond between the surfaces, 50 and 66. In this example, the interior adhesive 64 and the exterior adhesive 56 are the same adhesive material. Thus, "interior" and "exterior" are being used merely to distinguish between the locations of the adhesive. Alternatively, the exterior adhesive 56 and the interior adhesive 64 are different adhesive materials.

In the illustrated example, the interior adhesive 64 between the longitudinal rail portion 34 and the interior surface 50 of the top wall 28 of the central SMC component 22 has the shape of multiple thin rectangular strips, which correspond to the contact surfaces between the longitudinal rail portion 34 and the interior surface 50. An interior longitudinal rail heater 76 has a similar contacting shape corresponding to the contact or engaging surfaces between the longitudinal rail portion 34 and the interior surface 50 of the top wall 28. An exterior longitudinal rail heater 78 has a corresponding contact shape as well. The interior longitudinal rail heater 76 is positioned directly against the interior surface of the longitudinal rail portion 34. Simultaneously, the exterior longitudinal rail heater 78 is positioned directly against the outer surface 40 of the top wall 28. Thus, heat is simultaneously conductively applied to both sides of the longitudinal rail portion 34 of the interior adhesive 64 to fully cure the interior adhesive 64.

The interior adhesive 64 between the gusset portion 36 and the interior surface 50 of the rear wall 30 of the central SMC component 22 has a generally inverted U-shape, which corresponds to the contact surfaces between the gusset portion 36 and the interior surface 50. A space is provided, however, between fastener apertures 74 and the interior adhesive 64 in which the interior adhesive 64 is absent. Each fastener aperture 74 extends through the gusset portion 36 and the rear wall 30 and is aligned with one of the threaded fastener apertures 46 of the tapping plate 38.

The contact surfaces of the gusset portion 36 correspond to a contacting portion 68 of the gusset portion 36. The gusset portion 36 additionally includes a non-contacting portion 70. The rivets 44 extend through the rear wall 30 in the non-contacting portion 70 of the gusset portion 36. Thus, the rivets 44 already coupling the tapping plate 38 do not interfere with the positioning, and interior heat bonding of the gusset portion 36 to the rear wall 30 of the central SMC component 22.

An interior gusset heater 72, also having a generally inverted U-shape, is positioned directly against the interior surface 50 of the gusset portion 36 of the reinforcing SMC component 26 on the interior side of the interior adhesive 64. The interior gusset heater 72 conductively heats, and partially cures, the rear gusset portion 36 of the interior adhesive 64 forming, at least partially, the interior adhesive bond between the rear wall 30 of the central SMC component 22 and the rear gusset portion 36 of the reinforcing SMC component 26. No heat is conductively applied against the exterior surface 40 of the rear wall 30. The already-bonded rear SMC component 24 prevents direct contact access to this surface 40, as does the tapping plate 38. In this example, the threaded fasteners 48 do not interfere with the direct contact of the interior gusset heater 72 because they have not yet been inserted to fasten the rear gusset portion 36 to the rear wall 30.

In this example, the interior longitudinal rail heater 76 and the interior gusset heater 72 operate and move together as portions of a single heater unit. When this interior rail and gusset heater 76, 72 is positioned directly against the reinforcing SMC component 26, the exterior rail heater 78 is simultaneously positioned against the central SMC component 22. Thus, the heat is simultaneously supplied to both the interior and exterior sides of the longitudinal rail portion 34 of the interior adhesive 64, and to the interior side of the rear gusset portion 36 of the interior adhesive 64. Alternatively, the interior gusset heater 72 contacts and conductively heats the interior side of the rear gusset portion 36 of the interior adhesive 64 for a longer period of time than the interior rail heater 76, the exterior rail heater 78, or both, operate to conductively heat the longitudinal rail portion 34 of the interior adhesive 64.

In this example, the threaded gusset fasteners 48 are installed through the rear wall 30 and into threaded apertures 46 of the tapping plate 38 to fixedly retain the exterior, or exteriorly-facing, surface of the rear gusset portion 36 against the rear wall 30, while the partially formed interior adhesive bond therebetween subsequently cures. As a result of the threaded fasteners 48 providing this fixed contact, this partially cured bond is protected, allowing further assembling or manufacturing activities to occur to the SMC roof assembly 20 while the bond finishes curing.

In this example, such assembling or manufacturing activities include moving the SMC roof assembly 20 to an e-coating paint station and then baking the SMC vehicle roof assembly 20 in an e-coating oven to cure the paint. This baking in the e-coating oven to cure the paint provides convective heating that further cures the partially cured rear gusset portion 36 of the interior adhesive 64. Alternatively, this e-coating baking provides convective heating that results in the partially cured rear gusset portion 36 of the interior adhesive 64 being fully cured without requiring any additional steps or bake time beyond that required to cure the paint.

As noted above, the example SMC roof assembly 20 is a removable hardtop roof for a two-door automobile 19. The reinforcing SMC component 26 is positioned in the middle of the two-door hardtop roof 20 with the longitudinal rail portion 34 extending in, or aligned with, the fore/aft direction of the two-door hardtop roof 20. In order to maximize rear passenger headroom, no additional fore/aft reinforcing SMC components and no laterally, or side-to-side, reinforcing SMC components extend perpendicular thereto. Due to the lack of additional, differently oriented reinforcing SMC components, the single, central, longitudinally extending reinforcing SMC component 26 is designed to enhance the NVH properties of the two-door hardtop roof 20 related to movement or flexing of the rear wall 30. One aspect of this involves providing the reinforcing SMC component 26 with the rear gusset portion 36 for interiorly bonding to the rear wall 30. Thus, the rear gusset portion extending from the longitudinal rail portion strengthens and stabilizes the rear wall 30, resulting in enhanced NVH properties of the two-door hardtop roof 20 in use.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of assembling a sheet molding composite (SMC) vehicle roof assembly, the method comprising:
    forming a central SMC component having an interior surface and an exterior surface to include a top wall with a rear wall extending from the top wall;
    forming an rear SMC component having an interior surface and an exterior surface;
    forming a reinforcing SMC component having a longitudinal rail portion and a rear gusset portion;
    coupling a tapping plate against the exterior surface of the rear wall of the central SMC component;
    positioning the rear SMC component against the exterior surface of the central SMC component to form a cavity adjacent the rear wall and enclosing the coupled tapping plate between the central and rear SMC components and with an exterior adhesive for forming an exterior adhesive bond therebetween;
    positioning a heater against each of the interior surface of the central SMC component and the exterior surface of the rear SMC component on opposite sides of the exterior adhesive to heat and cure the exterior adhesive and to form the exterior adhesive bond therebetween;
    positioning the reinforcing SMC component with the longitudinal rail portion against the interior surface of the top wall of the central SMC component and with the rear gusset portion against the interior surface of the rear wall opposite the cavity, and with an interior adhesive for forming an interior adhesive bond therebetween;

positioning a rail heater against each of (1) the interior surface of the longitudinal rail portion of the reinforcing SMC component and (2) the exterior surface of the top wall of the central SMC component on opposite sides of the interior adhesive to heat and cure a longitudinal rail portion of the interior adhesive and form the interior adhesive bond between the top wall of the central SMC component and the longitudinal rail portion of the reinforcing SMC component;

positioning an interior gusset heater against the interior surface of the rear gusset portion of the reinforcing SMC component to heat and partially cure a rear gusset portion of the interior adhesive and form the interior adhesive bond between the rear wall of the central SMC component and the rear gusset portion of the reinforcing SMC component;

installing a gusset fastener through the rear gusset portion and the rear wall and into the tapping plate to fixedly retain the rear gusset portion against the rear wall while the partially formed interior adhesive bond subsequently cures;

wherein the exterior adhesive bond is formed prior to forming the interior adhesive bond.

2. The method of assembling a SMC vehicle roof assembly of claim 1, wherein the gusset fastener is installed after the partially curing the rear gusset portion of the interior adhesive.

3. The method of assembling a SMC vehicle roof assembly of claim 1, wherein the gusset fastener comprises a plurality of threaded gusset fasteners and installing the threaded gusset fasteners comprises threading the threaded gusset fasteners into respective cooperating threaded openings of the tapping plate after the partially curing the rear gusset portion of the interior adhesive.

4. The method of assembling a SMC vehicle roof assembly of claim 1, wherein forming the reinforcing SMC component further comprises forming a gusset fastener aperture in a rear wall contacting portion of the rear gusset portion; and further comprising providing a space between the gusset fastener aperture and the rear gusset portion of the interior adhesive in which the interior adhesive is absent.

5. The method of assembling a SMC vehicle roof assembly of claim 1, wherein coupling the tapping plate comprises riveting the tapping plate to the exterior surface of the rear wall of the central SMC component.

6. The method of assembling a SMC vehicle roof assembly of claim 5, wherein forming the reinforcing SMC component comprises forming the rear gusset portion with both rear wall contacting and non-contacting portions, and positioning the rivets within the rear wall non-contacting portion of the rear gusset.

7. The method of assembling a SMC vehicle roof assembly of claim 1, wherein forming the central SMC component, the rear SMC component, and the reinforcing SMC component, comprises forming components of a two-door vehicle removable hard top.

8. The method of assembling a SMC vehicle roof assembly of claim 7, wherein positioning the reinforcing SMC component comprises positioning the reinforcing SMC component in a middle of, and with the longitudinal rail portion aligned with a fore/aft direction of the SMC vehicle roof assembly.

9. The method of assembling a SMC vehicle roof assembly of claim 1, wherein positioning the reinforcing SMC component comprises positioning the reinforcing SMC component in a middle of, and with the longitudinal rail portion aligned with a fore/aft direction of the SMC vehicle roof assembly.

10. The method of assembling a SMC vehicle roof assembly of claim 7, further comprising painting and then baking the SMC vehicle roof assembly in an e-coating oven to cure the paint, wherein the baking to cure the paint further cures the partially cured rear gusset portion of the interior adhesive.

11. The method of assembling a SMC vehicle roof assembly of claim 1, further comprising designing the reinforcing SMC component including the rear gusset portion to enhance noise, vibration and harshness properties of the SMC vehicle roof assembly related to movement of the rear wall of the central SMC component.

\* \* \* \* \*